United States Patent
Strehler et al.

[15] 3,686,971
[45] Aug. 29, 1972

[54] COMPOUND CRANKSHAFT WITH A DRIVE-GEAR WHEEL FOR MULTI-CYLINDER PISTON ENGINES, ESPECIALLY INTERNAL COMBUSTION ENGINES

[72] Inventors: Erich Strehler, Esslingen; Fritz Kaumle, Leonberg-Eltingen; Rolf Weber, Stuttgart, all of Germany

[73] Assignee: Firma Dr. - Ing. h.c.f. Porsche K-G, Stuttgart, Germany

[22] Filed: Oct. 6, 1970

[21] Appl. No.: 78,374

[30] Foreign Application Priority Data

Oct. 10, 1969    Germany..........P 19 51 097.5

[52] U.S. Cl............................................74/597, 29/6
[51] Int. Cl.................................................F16c 3/10
[58] Field of Search ..............74/597, 598, 595; 29/6

[56] References Cited

UNITED STATES PATENTS

| | | |
|---|---|---|
| 1,063,323 | 6/1913 | Bock ..........................74/597 |
| 1,336,546 | 4/1920 | Wall ..........................74/597 |
| 1,858,014 | 5/1932 | Herr ..........................74/597 |
| 2,249,802 | 7/1941 | Wilson.....................74/597 X |
| 2,252,480 | 8/1941 | Boulet .....................74/597 X |
| 2,479,245 | 8/1949 | Lundquist................74/597 X |
| 3,537,333 | 11/1970 | Seifert et al. ................74/597 |

*Primary Examiner*—William F. O'Dea
*Assistant Examiner*—F. D. Shoemaker
*Attorney*—Graig, Antonelli and Hill

[57] ABSTRACT

Compound crankshaft with a driving-gear wheel for multi-cylinder piston engines, especially internal combustion engines, which crankshaft is split perpendicularly in the area of the crankshaft journals and fitted together under the formation of an expansion joint formed by a pressed fit and welded butt joint. The perpendicularly split crankshaft in the plane of the journals are electron-ray welded together at the expansion joint of adjacent journals. A ventable hollow space is formed between the journals joined together.

24 Claims, 1 Drawing Figure

Patented Aug. 29, 1972  3,686,971
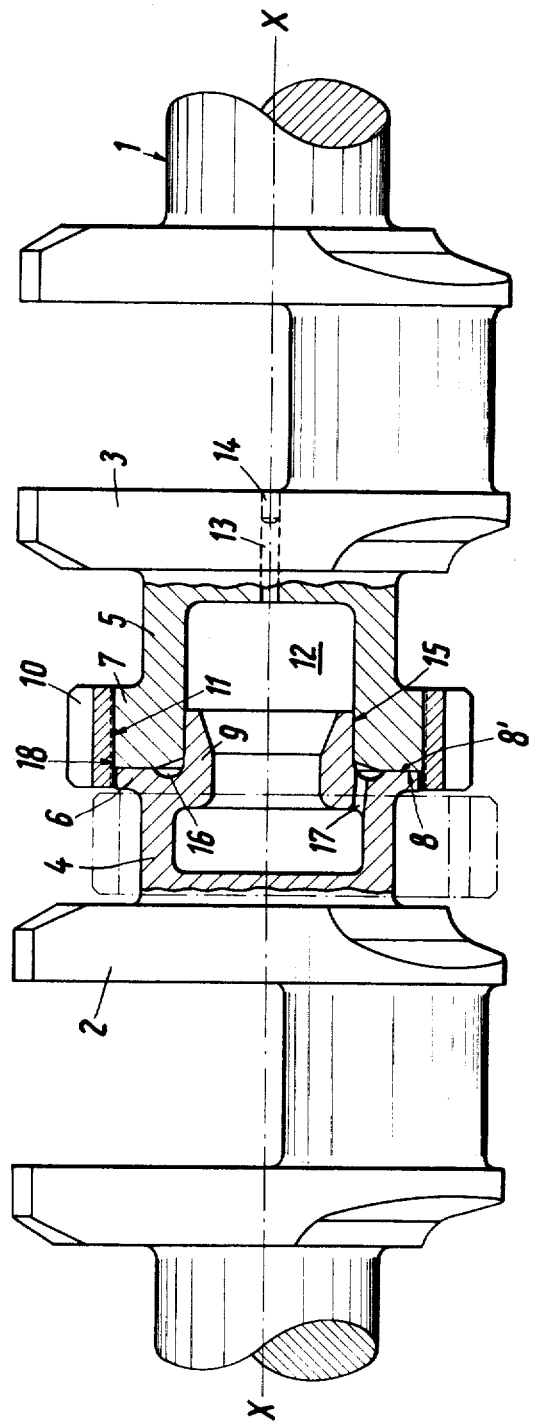
Inventors
ERICH STREHLER, FRITZ KAUMLE
AND ROLF WEBER
BY Craig, Antonelli, Stewart & Hill
ATTORNEYS

COMPOUND CRANKSHAFT WITH A DRIVE-GEAR WHEEL FOR MULTI-CYLINDER PISTON ENGINES, ESPECIALLY INTERNAL COMBUSTION ENGINES

BACKGROUND OF THE INVENTION

The present invention relates to a compound crankshaft with a driving-gear wheel for multi-cylinder piston engines, especially internal combustion engines, and more particularly, to a compound crankshaft which is divided in the area of the crankshaft journals and is fitted together under the formation of an expansion joint formed by a pressed fit and welded butt joint. The perpendicularly split crankshaft, in the plane of the journals is provided at the joints of adjacent journals with annular faces which face each other and are electron-ray welded together to form a ventable hollow space.

In a known arrangement, the crankshaft consists of one or a number of journals which, in the plane of the journals, are perpendicularly split and have a hollow space that can be vented. A driving-gear wheel is inserted between the journals and is provided on both sides of its faces with a centering collar for centering in the journals. The centering collar is, under the provision of foils inserted in the welding zone, attached to the journal by means of electron-ray welding.

The above-mentioned design has been successful in practice and also results in a safe and elastic weld connection; however, the expenditure for various pairing of materials between the driving-gear wheel and the journals of the crankshaft through insertion of foils is both time-consuming and expensive. In addition, the subsequent grinding of the weld seam has proven to be costly and requires a further work process.

SUMMARY OF THE INVENTION

It is the aim of the present invention to overcome the problems and disadvantages encountered with the known crankshaft arrangements.

More particularly, it is an object of the present invention to provide a simple fastening of a driving-gear wheel onto a journal jointed together by electron-ray welding of a compound crankshaft.

The foregoing problems and disadvantages have been solved in accordance with the present invention by providing radial collars in the planes of the journal faces, of which at least one serves for the fastening of the driving-gear wheels which is placed on one of the journals before welding. In an advantageous manner, one of the journals is provided with a centering spigot extending from its face which extends into a fitted bore of the hollow space of the adjacent journal.

A further advantageous feature is that the journals are provided with a radially extending vent groove in the area of the faces. A special advantage is obtained due to the fact that one of the journals is provided with one or a number of vent bores equally spaced along the circumference which connects the vent groove with the hollow space of the journal.

A further advantage obtained in accordance with the present invention resides in that the collars of the journals have different diameters. The inside of the drive-gear is advantageously provided with a tooth-like surface which serves for the secure connection with the collars of the journal.

In accordance with the present invention, the advantages obtained through therein reside in that, with the construction of the journals, each with a radial collar, an especially favorable bearing for the drive-gear wheel can be obtained. Therefore drive-gear wheels of non-suitable material for the electron-ray welding process may also be used. Consequently, a simple and safe weld connection of the journals can be obtained without additional means.

Through the arrangement of a centering shoulder at one of the journals, an accurate centering of the two journals, one with the other, is obtained and an increase in the bending strength in the welding zone is accomplished. Due to the arrangement of a radially extending vent groove in the area of the journal faces, a good weld connection of the journals is also accomplished. Thereby, one of the journals being provided with vent bores which connect the vent groove with the hollow space of the journals assures that the entire weld area is held securely under the vacuum required for the electron-ray welding process. Due to this means, a weld connection is achieved with considerably greater ease.

In accordance with the present invention, the construction of the collars of the journals with different diameters makes a simple positioning of the drive-gear wheel onto the journals prior to the weld connection possible. Further, this arrangement avoids a protruding weld seam so that the collar of the journal receiving the drive-gear wheel may be completely machined. The serrated surface of the inside of the drive-gear wheel results through simple means in a safe and rigid-against-turning connection at the journal of a crankshaft.

BRIEF DESCRIPTION OF THE DRAWING

These and further aims, advantages and features of the present invention will become more apparent from the following description when taken in conjunction with the accompanying drawing which shows, for purposes of illustration only, an exemplified embodiment of the present invention and wherein:

The sole FIGURE is a partial cross-sectional side view of the compound crankshaft having a drive-gear wheel assembled to a journal by electron-ray welding.

DETAILED DESCRIPTION OF THE DRAWING

Referring now to the sole FIGURE, a crankshaft 1 consists of crank portions 2, 3 provided with journals 4, 5 which are directly connected with each other by means of electron-ray welding. The journals 4, 5 are each provided with a radial collar 6, 7 which is arranged within the area of the faces 8, 8', respectively. Collar 6 of journal 4 is of smaller outer diameter than collar 7 of journal 5 and is provided with a centering shoulder 9 extending from face 8. Collar 7 serves to receive and fasten a drive-gear wheel 10 and is provided with a wide bearing base 11 corresponding to the drive-gear wheel 10.

The journals 4, 5 are also provided with a hollow space 12 which is connected by means of a vent bore 13 arranged in crank portion 3 with the atmosphere of the welding chamber required for the electron-ray welding process. A plug 14 is provided for closing the vent bore 13. A portion of the hollow space 12 is constructed as a fitted bore 15 in journal 5, thereby serving to receive the centering shoulder 9 of journal 4.

Faces 8, 8' of collars 6, 7 are provided with a radially extending vent groove 16 in the transition area to the centering shoulder 9 respectively to the fitted bore 15 which is in communication with the hollow space of the journals 4, 5 through a number of vent bores 17. The vent bores 17 are arranged so as to be equally spaced at the circumference and extend approximately parallel to the axis of rotation X—X of the journals 4, 5. The inside 18 of the drive-gear wheel is provided with a serrated-type surface.

For connecting the journals 4, 5 of the two crank portions 2, 3 and for fastening of the drive-gear wheel 10 to collar 7, the drive-gear wheel 10 is first assembled over collar 6 having the smaller diameter and is then placed onto the journal 4. The journal 5 of crank portion 3 with its fitted bore 15 is then placed over the centering shoulder 9 of journal 4 until the faces 8, 8' touch each other. The crankshaft 1, thus preassembled, is brought into a welding chamber (not shown) of an electron-ray welding device in which a vacuum of $10^{-4}$ mm Hg is created. By means of the vent bores 13, 17 and vent groove 16, it is thereby assured that, at the inside of the journals 4, 5 and, especially, at the internal welding zone of the faces 8, 8', the required vacuum exists whereby a reliable weld connection can be obtained. Subsequent to the welding process, the crankshaft 1, as assembled, is placed into a receiver (not shown). The drive-gear wheel 10 of journal 4 is now pressed onto the collar 7 of journal 5. The serrated surface of the inside 18 of the drive-gear wheel 10 therewith impresses itself into the surface of collar 7, whereby a connection of the drive-gear wheel 10 is obtained, which connection is secured from turning and lateral shifting. Subsequently, the vent bore 13 of hollow space 12 is closed by plug 14.

Although we have shown and described an embodiment in accordance with the present invention, it is to be clearly understood that the same is susceptible of numerous changes and modifications as will be apparent to one skilled in the art. For example, the inside 18 of the drive-gear wheel 10 could be provided with a smooth surface instead of the serrated surface and also could be fastened to the collar 7 of journal 5 by adhesive means using a suitable cement material. We, therefore, do not wish to be limited to the details set forth herein, but intend to cover also such changes and modifications as encompassed by the scope of the present invention.

What is claimed is:

1. A compound crankshaft and drive-gear wheel arrangement for multi-cylinder piston type engines, especially internal combustion engines; said arrangement comprising: first and second crankshaft journal portions abuttingly connected together at respective first and second annular end faces provided on said journal portions, said annular end faces being connected with one another by electron-ray welding means, at least one of said journal portions having a recess adjacent the respective end face thereof such that a ventable hollow space is formed between said journal portions, a first radial collar on said first journal portion adjacent said first annular end face, and a second radial collar on said second journal portion adjacent said second annular end face, said first radial collar including means for holding a drive-gear wheel on said first journal portion prior to completion of the welding of the end faces together.

2. An arrangement according to claim 1, wherein one of the journal portions is provided with a centering shoulder extending from the end face thereof, which centering shoulder extends into a fitted bore of the other journal portion whereby the end faces of the respective journal portions are centered with respect to one another.

3. An arrangement according to claim 1, wherein the journal portions are provided with radially extending vent groove means in the area of the annular end faces.

4. An arrangement according to claim 3, wherein one of the journals is provided with vent bore means equally spaced at the circumference thereof for connecting the vent groove means with the hollow space.

5. An arrangement according to claim 4, wherein one of the journal portions is provided with a centering shoulder extending from the end face thereof, which centering shoulder extends into a fitted bore of the other journal portion whereby the end faces of the respective journal portions are centered with respect to one another.

6. An arrangement according to claim 1, wherein the first and second radial collars are of different diameters.

7. An arrangement according to claim 1, wherein the drive-gear wheel has serrated surface means at the inner perimeter thereof for establishing a fixed connection with at least one of the collars.

8. An arrangement according to claim 6, wherein one of the journal portions is provided with a centering shoulder extending from the end face thereof, which centering shoulder extends into a fitted bore of the other journal portion whereby the end faces of the respective journal portions are centered with respect to one another.

9. An arrangement according to claim 8, wherein the journal portions are provided with radially extending vent groove means in the area of the annular end faces.

10. An arrangement according to claim 9, wherein one of the journals is provided with vent bore means equally spaced at the circumference thereof for connecting the vent groove means with the hollow space.

11. An arrangement according to claim 6, wherein the first radial collar has a maximum external diameter smaller than the maximum external diameter of said second radial collar, the maximum external diameter of said first radial collar also being smaller than the diameter of a central opening in the drive-gear wheel whereby said drive gear wheel can be easily slipped over said first radial collar to be held by said radial collar during the welding connection of said end faces.

12. An arrangement according to claim 11, wherein the second radial collar has a maximum external diameter corresponding closely to the diameter of the central opening of the drive gear wheel whereby the drive gear wheel can be tightly fitted to the periphery of said second radial collar after the welding connection of the end faces.

13. An arrangement according to claim 12, wherein the second radial collar has a greater longitudinal extent than the first radial collar whereby a large bearing surface between the drive gear wheel and the journal portions is effected.

14. An arrangement according to claim 13, wherein the second radial collar is provided with serrations at its maximum diameter for engaging with corresponding serrations provided in the central opening of the drive gear wheel to rotatably fix the drive gear wheel and second radial collar to one another.

15. A compound crankshaft and drive gear wheel arrangement for multi-cylinder piston type engines, especially internal combustion engines; said arrangement comprising: first and second crankshaft journal portions abuttingly connected together at respective first and second annular end faces provided on said journal portions, said first journal portion including a centrally disposed shoulder member protruding longitudinally outwardly from adjacent said first end face, said second journal portion including a centrally disposed bore extending longitudinally inwardly from adjacent said second end face, said shoulder and said bore being dimensioned to center and support said journal portions with respect to one another in the assembled position with said respective end faces abuttingly connected, and means for attaching a drive gear wheel adjacent said end faces on said journal portions.

16. An arrangement according to claim 15, wherein said first journal portion includes a radially outwardly extending first collar adjacent said first end face, wherein said second journal portion includes a radially outwardly extending second collar adjacent said second face, and wherein one of said first and second collars includes fastening means for fastening the drive gear wheel to the periphery of said one of said collars.

17. An arrangement according to claim 16, wherein said fastening means includes serrations formed on the periphery of said one of said collars.

18. An arrangement according to claim 16, wherein said second collar includes the fastening means, said fastening means including serrations on the periphery of said second collar for engaging with walls of a centrally disposed opening in said drive gear wheel.

19. An arrangement according to claim 18, wherein the maximum external diameter of said first collar is slightly less than the diameter of said opening in said drive gear wheel whereby the drive gear wheel can be loosely placed over said collar and said first end face prior to connecting of said end faces together.

20. An arrangement according to claim 19, wherein the maximum external diameter of said second collar is substantially equal to the diameter of said opening in said drive gear wheel whereby the drive gear wheel can be tightly secured to said second collar after the end faces are connected together.

21. An arrangement according to claim 18, wherein the longitudinal distance of said first collar between said first end face and a crank portion on said first journal portion is greater then the longitudinal extent of said drive gear wheel whereby said drive gear wheel can be held on said first journal portion at a position spaced from said end face.

22. An arrangement according to claim 15, wherein said end faces are connected by electron beam welding.

23. An arrangement according to claim 22, wherein said bore forms part of a ventable hollow space between said journal portions.

24. An arrangement according to claim 20, wherein said end faces are connected by electron beam welding, and wherein said bore forms part of a ventable hollow space between said journal portions.

* * * * *